United States Patent
Mitchell et al.

(10) Patent No.: US 6,690,832 B1
(45) Date of Patent: Feb. 10, 2004

(54) METHOD, SYSTEM, AND PROGRAM FOR DECODING COMPRESSED DATA AT MULTIPLE POINTS

(75) Inventors: Joan LaVerne Mitchell, Longmont, CO (US); Nenad Rijavec, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 09/697,544

(22) Filed: Oct. 26, 2000

(51) Int. Cl.$^7$ ................................. G06K 9/64
(52) U.S. Cl. ......................... 382/233; 341/51
(58) Field of Search ................. 382/232–253; 375/240–241; 341/51, 107; 345/558–569; 348/390.1–408.1

(56) References Cited

U.S. PATENT DOCUMENTS

| | | | |
|---|---|---|---|
| 4,546,385 A | | 10/1985 | Anastassiou |
| 4,616,220 A | | 10/1986 | Grunewald et al. |
| 4,745,473 A | | 5/1988 | Hall |
| 4,905,297 A | | 2/1990 | Langdon, Jr. et al. |
| 5,254,984 A | | 10/1993 | Wakeland |
| 5,371,841 A | | 12/1994 | Jones |
| 5,442,458 A | | 8/1995 | Rabbani et al. |
| 5,717,394 A | * | 2/1998 | Schwartz et al. ............. 341/51 |
| 5,881,173 A | | 3/1999 | Ohmori |
| 5,903,282 A | * | 5/1999 | Schoner et al. ............. 345/558 |
| 5,973,630 A | * | 10/1999 | Heath ......................... 341/51 |
| 6,009,203 A | * | 12/1999 | Liu et al. .................... 382/233 |
| 6,385,341 B1 | * | 5/2002 | Lisitsa et al. ............... 382/233 |
| 6,591,013 B1 | * | 7/2003 | Taunton ...................... 382/233 |

OTHER PUBLICATIONS

U.S. Ser. No. 09/569,573, filed Mar. 10, 2000, entitled "Reordering of Compressed Data".

R.B. Arps, et al., "A Multi–Purpose VLSI Chip for Adaptive Data Compression of Bilevel Images", IBM J. Res. Develop, vol. 32, No. 6, Nov. 1988, pp. 775–795.

M.D. Schroeder, "JPEG Compression Algorithm and Associated Data Structures", University of North Dakota, Retrieved on Jul. 31, 2000 from the internet: <URL:http://www.cs.und.edu/~mschroed/jpeg.html, pp. 1–17.

W.B. Pennebaker, et al., "JPEG Still Image Data Compression Standard", (New York, Reinhold, 1993), pp. 409–430.

\* cited by examiner

*Primary Examiner*—Jingge Wu
(74) *Attorney, Agent, or Firm*—David W. Victor; Konrad Raynes Victor & Mann, LLP

(57) ABSTRACT

Provided is a method, system, program, and data structures for decompressing a compressed data stream. The compressed data stream is decoded a first time to generate multiple reentry data sets. Each reentry data set includes a pointer to a location in the data stream and decoding information that enables decoding to start from the location addressed by the pointer. The compressed data stream is then decoded from the beginning to a point preceding a location addressed by a first reentry data set. For each generated reentry data set, the location in the compressed data stream addressed by the pointer in the reentry data set is accessed. The decoding information in the reentry data set is then used to decode compressed data from the accessed location to a point preceding the location addressed by the pointer in the next reentry data set. For concatenated bit planes, the original multi-bit pixel values are reassembled in buffers and then outputted.

53 Claims, 6 Drawing Sheets

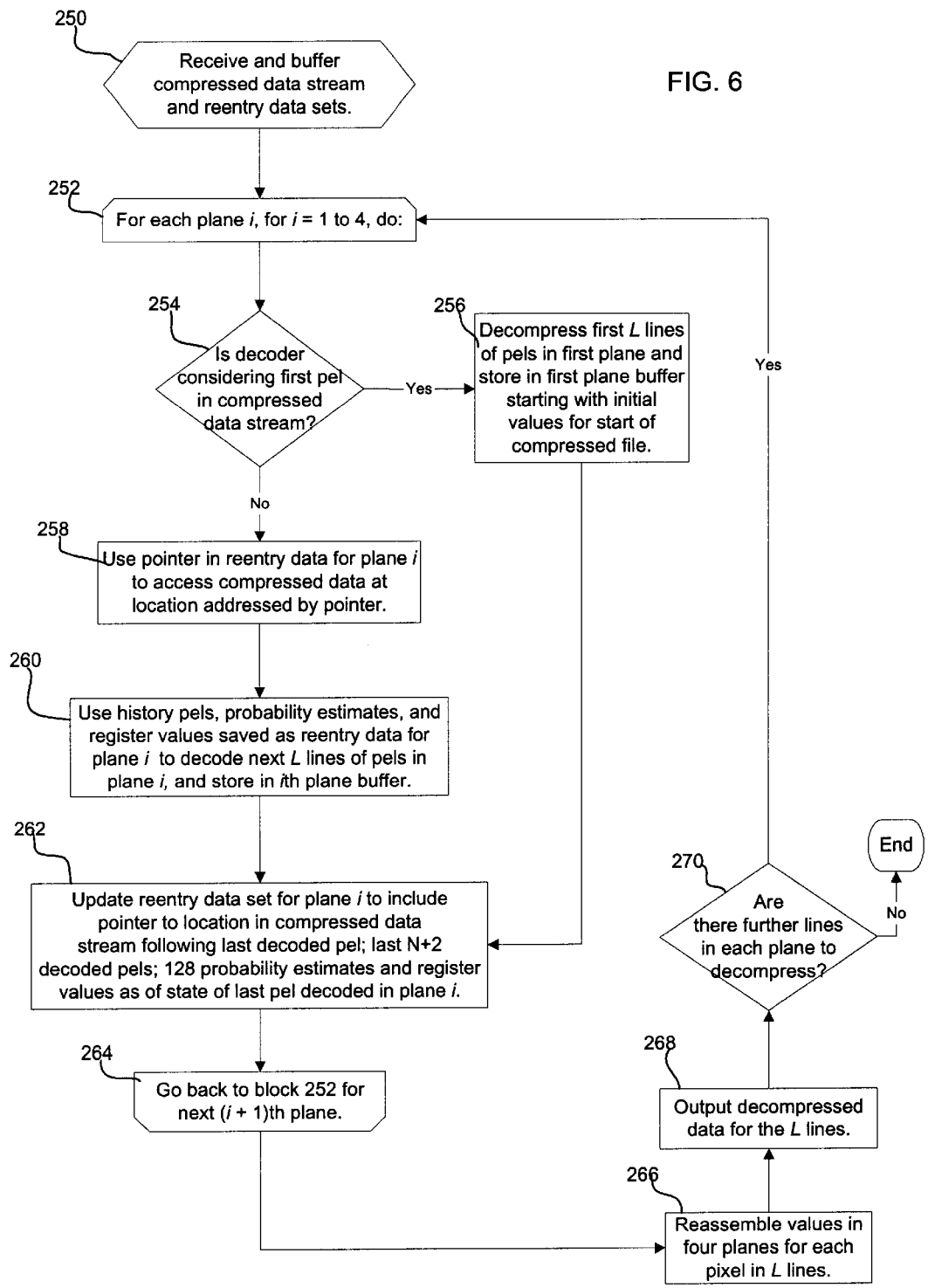

METHOD, SYSTEM, AND PROGRAM FOR DECODING COMPRESSED DATA AT MULTIPLE POINTS

BACKGROUND OF THE INVENTION

1. Field of the Invention

The present invention relates to a method, system and program for decoding compressed data.

2. Description of the Related Art

Digital images may use one or more bits to describe the color intensity at each pixel. The term "pixel" as used herein refers to one or more intensity inputs or bit values at a data point that represents data to be rendered (i.e., printed, displayed, etc.), where the data to be rendered may include, but is not limited to, images, text, composite images, graphs, collages, scientific data, video, etc. A pel is a picture element point that may be expressed with one bit. If only one bit is used to express the intensity, then the image is a bilevel image where there are two possible intensity values per pixel, such as black and white or full saturation and no intensity. Digital monochrome images that allow for more than two intensities per pixel express the intensities as shades of grey.

Most systems compress image data before transmitting the data to an output device, such as a printer or display, that renders the image data. The output device must decode or decompress the compressed image to output to print or otherwise render. Compressed images may also be archived and then at some later time transmitted to an output device for decompression and rendering, e.g., printing or display. For instance, International Business Machines Corporation (IBM) uses a concatenated Adaptive Bi-Level Image Compression (ABIC) algorithm to compress check images created using high speed scanners. The IBM ABIC technology is one of the industry standards for high speed scanning and storing of check images.

FIG. I illustrates planes 2, 4, 6, 8 providing bit values for pixels in the plane, where each pixel has four bit values, one bit value from each plane. Each bit plane 2, 4, 6, 8 provides a one bit value for one pixel represented in the four planes. Bit plane 2 provides the most significant bit for each pixel represented in the plane, bit plane 4 the second most significant bit, bit plane 6 the third most significant bit, and bit plane 8 the least significant bit for each pixel represented in the four planes 2, 4, 6, 8. Each plane provides one of the four bits used to express the intensity level, e.g., shade of grey, for the pixel. When four planes are used, there are sixteen possible intensity values for each pixel.

In the prior art IBM scanning and storage system, the checks are scanned and the scanned data processed down to produce sixteen possible levels of intensity for each pixel on the check. Each intensity value for a pixel can be expressed in four bits or four planes of data. Before compressing the data using the ABIC algorithm, the planes providing bit values for the pixels are concatenated as shown in FIG. 2. into a single bi-level image 10 with four times the height and the same width. Concatenating the planes allows a grey scale image having more than two possible intensity values per pixel to be compressed as a bi-level image.

An ABIC coder would use arithmetic coding to code the concatenated image as a bi-level image. The ABIC algorithm of the prior art would sequentially code each bit of image data by using the seven nearest neighbor bits and a probability distribution that is calculated based on previously coded data. In current implementations, the ABIC decoder maintains a history group of bits comprising the last N +2 decoded bits. In certain current implementations, the ABIC decoder uses seven of the bits, including the last two decoded bits and bits in the history range from the (N −2) bit to the (N +2) bit. These are the seven nearest bits in the bit data stream. Details of using the ABIC algorithm to code and decode data are described in the IBM publication entitled "A Multi-Purpose VLSI Chip for Adaptive Data Compression of Bilevel Images", by R. B. Arps, T. K. Truong, D. J. Lu, R. C. Pasco, and T. D. Friedman, IBM J. Res. Develop., Vol. 32, No. 6, pgs. 775–795 (November 1988) and the commonly assigned U.S. Pat. No. 4,905,297, which publication and patent are incorporated herein by reference in their entirety.

In the prior art, to decompress data compressed as concatenated ABIC, the output device hardware must decompress and buffer the values for the first three planes. After decoding at least some values in the fourth plane, the decoder may reassemble the four bits for a pixel from the previously buffered three planes and just decoded bits in the fourth plane into the four bits for a pixel and then transfer the decoded four bits per pixel to the output device to render. This technique requires substantial hardware resources because the output device hardware must have sufficient buffer space to decode and store three planes of data before being able to output data and release space in the buffer.

Further, the delay in having to wait to decode the first three planes and part of the fourth plane before outputting data limits the ability of the output device to continually feed data to the printer. As printer throughput increases, at some speed, the decoding operations will not been able to provide output pixel data at the printing rate of the printer.

Thus, there is a need in the art for an improved technique for decoding compressed data and, in particular, concatenated images that were coded using ABIC or other encoding techniques such as Huffman encoding, especially when high speed output devices are being used that are capable of processing and rendering data very quickly.

SUMMARY OF THE PREFERRED EMBODIMENTS

Preferred embodiments describe a method, system, program, and data structure for decompressing a compressed data stream. At least one reentry data set is received. Each reentry data set includes a pointer to a location in the compressed data stream and decoding information that enables decoding to start from the location addressed by the pointer. Decoding is performed from the beginning of the compressed data stream to a point in the compressed data stream preceding a location addressed by a first reentry data set. For each generated reentry data set, the location in the compressed data stream addressed by the pointer in the reentry data set is accessed. The decoding information in the reentry data set is then used to decode compressed data from the accessed location to a point in the compressed data stream preceding the location addressed by the pointer in the next reentry data set. The decoded data is buffered and outputted.

In further embodiments, the decoding information includes decoded data preceding output produced by decoding the compressed data stream at the location addressed by the pointer and probability estimates used to decode the compressed data at the location addressed by the pointer. The data may be compressed and decoded using an Adaptive Bi-Level Image Compression (ABIC) algorithm, or other compression algorithms known in the art.

In still further embodiments, the compressed data comprises concatenated bit planes. Each reentry data set pointer addresses a location in the compressed data stream that when decoded produces a first bit value in one plane following the first plane.

Yet further, multiple iterations of decoding further data prior to each reentry data set and decoding further data following the last reentry data set are performed until the entire data stream has been decoded.

Preferred embodiments provide a technique using reentry data sets to allow decoding of different parts of a decompressed data stream when data from different parts, such as bits from different concatenated planes, are needed before any data can be outputted. With the preferred embodiments, data from different parts of the compressed data stream can be decompressed and outputted before having to decompress all or a substantial part of the data stream, thereby increasing the throughput or the rate at which data is outputted.

BRIEF DESCRIPTION OF THE DRAWINGS

Referring now to the drawings in which like reference numbers represent corresponding parts throughout:

FIG. 6 illustrates logic to use the reentry data sets to decompress and output multi-bit pixels in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
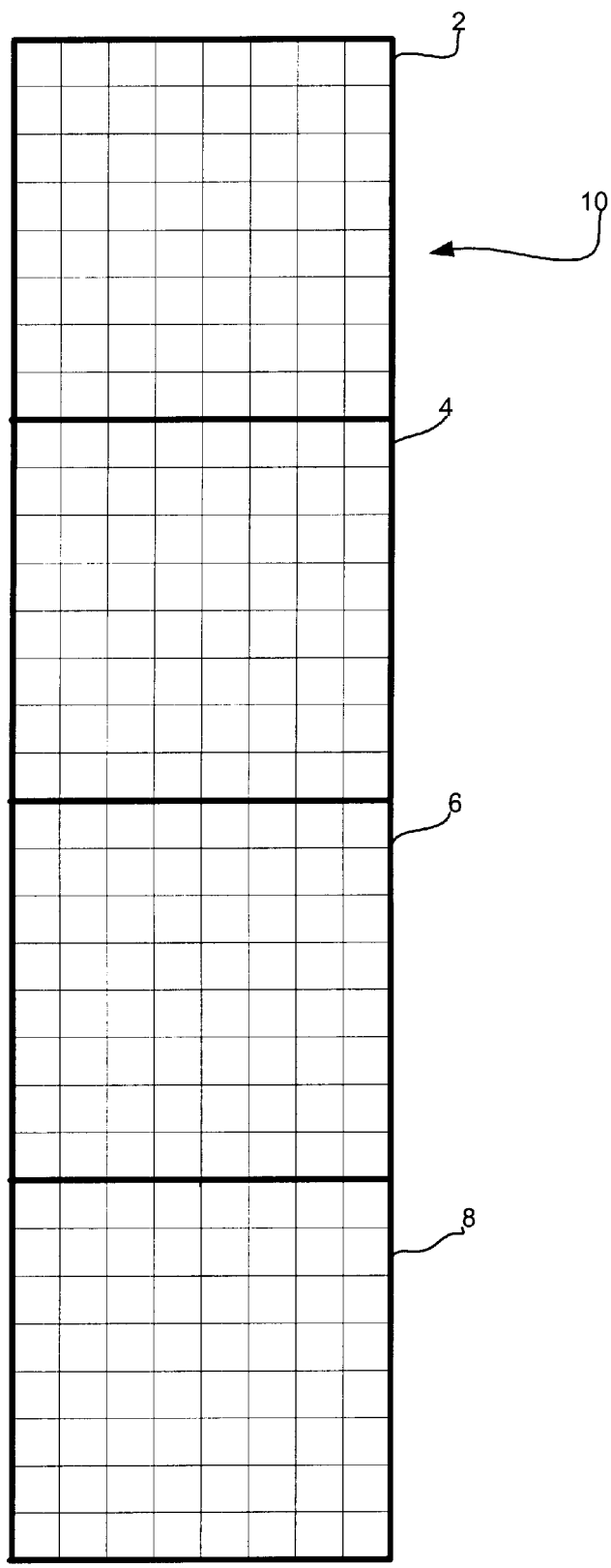
Figure 3:
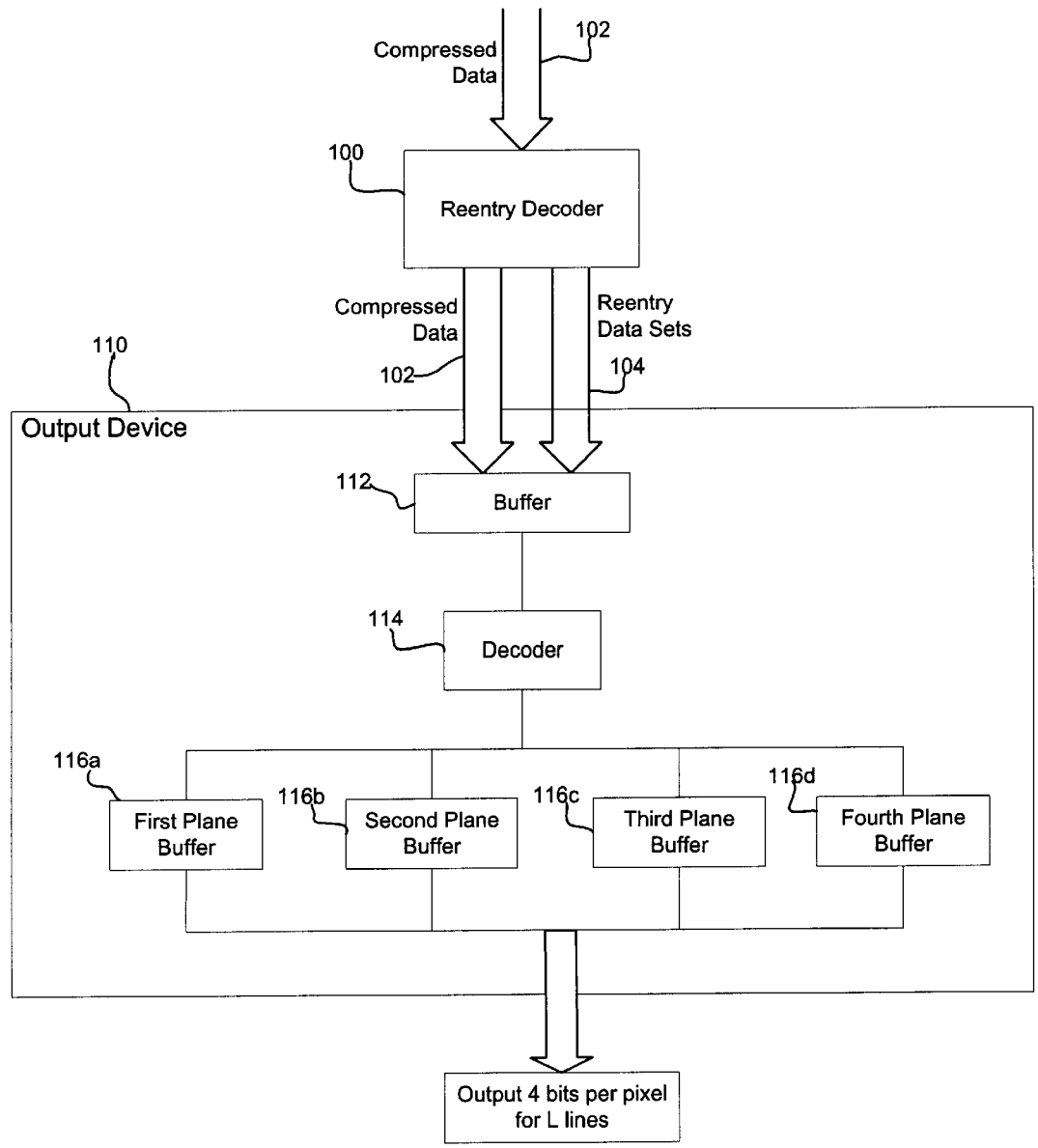
FIG. 3 illustrates a computing environment in which preferred embodiments are implemented.

FIG. 3 illustrates a computing environment in which preferred embodiments are implemented. A reentry decoder 100 receives a compressed data stream 102, which in preferred embodiments comprises a concatenated data stream, such as shown in FIG. 2 above, compressed using a standard ABIC algorithm known in the art. The reentry decoder 100 decompresses the compressed data stream 102 in the manner described below to generate reentry data sets 104 to allow a subsequent decoding operation to independently decode from different points in the compressed data stream 102. A reentry data set is provided for each plane 4, 6, 8 in the compressed concatenated bitmap. In the case that there are only two concatenated planes, only one reentry data set is needed to decode at the first bit in the second plane. As discussed, a reentry data set is not needed to decode the first plane because current decoding algorithms assume a default value of history bits to decode the first line of bits in the first plane. Likewise more planes require more reentry data sets.

Figures 4A, 4B:
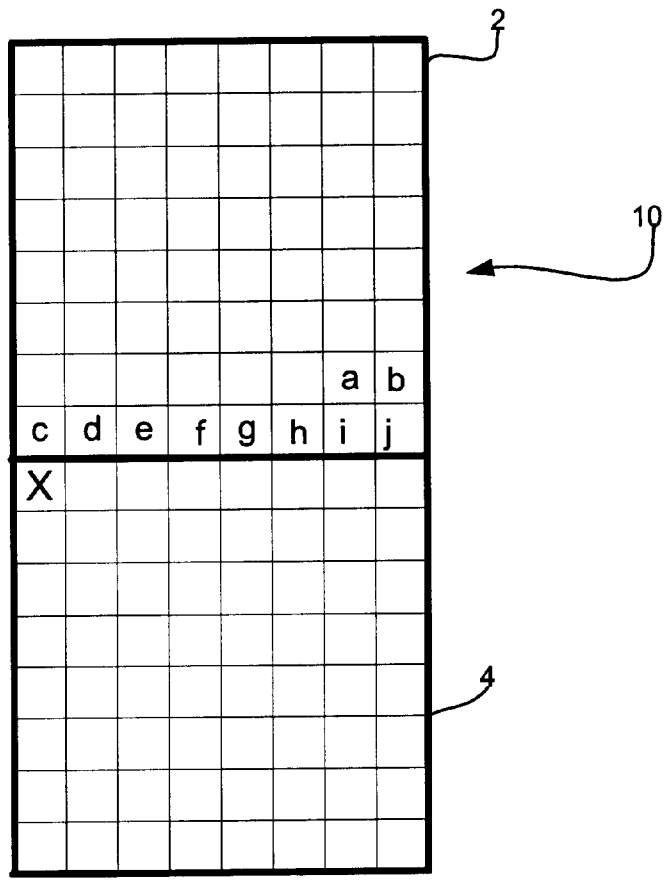
FIGS. 4a and 4b illustrate the history bit values maintained for use in decoding compressed data in a manner known in the prior art.

The reentry data set for a plane comprises an offset or pointer to a position in the compressed data whose decompressed output comprises one bit value for the first bit in one of the planes 4, 6, and 8; a history line of decoded bits, and 128 probability estimates. The history line comprises a last line of N bits plus two decoded bits, wherein N is the number of bits per line in the bit plane. The seven nearest neighbor bits used in the decoding comprise the following bits from the history line, the last two decoded bits and the bit range from the (N −2) bit to the (N +2) bit. FIG. 4a illustrates the seven history bits used to decode bit "X" in the event that the bit to decode is in the middle of a line of the bit plane, which would comprise the two most recent decoded bits i and j, as well as the range of bits from the previous line, which comprise bits a through e. FIG. 4b illustrates line of the last N plus two bits, where N is eight. The bits in FIG. 4b used to decode "X" would comprise the last two decoded bits i and j and the last sixth to tenth bit, or bits a through e. In this way, the nearest bits are defined in raster scan order. The bit selection of bits to use to decode one bit shown in FIGS. 4a, b are used in the current art to select bits from the last N plus two history bits to use in the ABIC decoding operation. The seven selected neighbor bits are used to select one of the 128 probability estimates to use to decode the first bit in plane 4 in a manner known in the art.

When coding the concatenated data stream, a coder (not shown) uses arithmetic coding to code a particular bit value based on seven neighbor bits and a probability estimate selected based on the value of the seven neighbor bits in a manner known in the art. The decoder that decodes the concatenated ABIC data stream looks at the seven neighbor bits and determines a probability estimate for the current bit being considered. The decoder then uses the probability estimate to decode the actual bit value. In this way, in a manner known in the art, the coding and decoding systems use the same statistical model or dynamic probability estimation process to determine how each coding decision is "conditioned" on prior coding decisions. Thus, the reentry decoder 100 would use the same dynamic probability estimation process to determine the probability estimate based on past data used by the coder when coding/compressing the data stream 102 in a manner known in the art. Further details of decoding and encoding the data stream are described in U.S. Pat. No. 4,905,297 and the IBM publication "A Multi-Purpose VLSI Chip for Adaptive Data Compression of Bi-Level Images", both incorporated by reference above. Further, "JPEG: Still Image Data Compression Standard", by William B. Pennebaker and Joan L. Mitchell (Van Nostrand Reinhold, 1993), at pages 409–430 describe arithmetic binary decoding and encoding.

In preferred embodiments, the history data for the first bit in the first plane 2 is assumed to be all zero data. After generating reentry data sets 104 for the first bit on the second plane 4, third plane 6, and fourth plane 8, the reentry decoder 100 transfers the received compressed data stream 102 and calculated reentry data sets 104 to an output device 110, which may comprise any device known in the art capable of rendering input data, such as a printer, display, a storage device for future rendering, etc. The entire compressed data stream 102 and reentry data sets 104 are stored in buffer 112 of the output device 110. The output device 110 includes a decoder 114 that accesses the reentry data sets 104 in the buffer 112 to decompress one or more lines of bit data from each of the four planes in the compressed data stream 102. The decoder 114 stores one or more lines of decompressed data from each plane in the respective plane buffer 116a, b, c, d. Once the decoded bit data for one or more lines from each plane 2, 4, 6, 8 is transferred to the buffers 116a, b, c, d, respectively, the complete four bits for one or more pixels may then be transferred to the output device and rendered or further processed, e.g., halftoned, screened, dithered, etc., before being rendered.

The decoder 114 may use multiplexing logic to sequentially decode one or more lines of bit data in each plane. Alternatively, the decoder 1 14 may be comprised of separate decoders to decode in parallel the bit data for each plane. The buffers 112 and 116a, b, c, d may be part of the same memory device or separate hardware buffers or memory devices. The reentry decoder 100 and decoder 114 may comprise a Q-Coder, an ABIC decoder, or any other decoder known in the art. The reentry decoder 100 may be located either external or internal to the output device 110. If the reentry decoder 100 is located internal to the output device 110, then the reentry decoder 100 unit may be separate from the decoder logic 114 or both may be part of the same logic unit. In alternative embodiments, the encoder could save-off the reentry data sets when coding the data stream and provide the reentry data sets to the decoder 114 to use to decode the compressed data stream at multiple points. This alternative implementation avoids the need for a reentry decoder 100 as the encoder is used to generate the reentry data sets.

Figure 5:
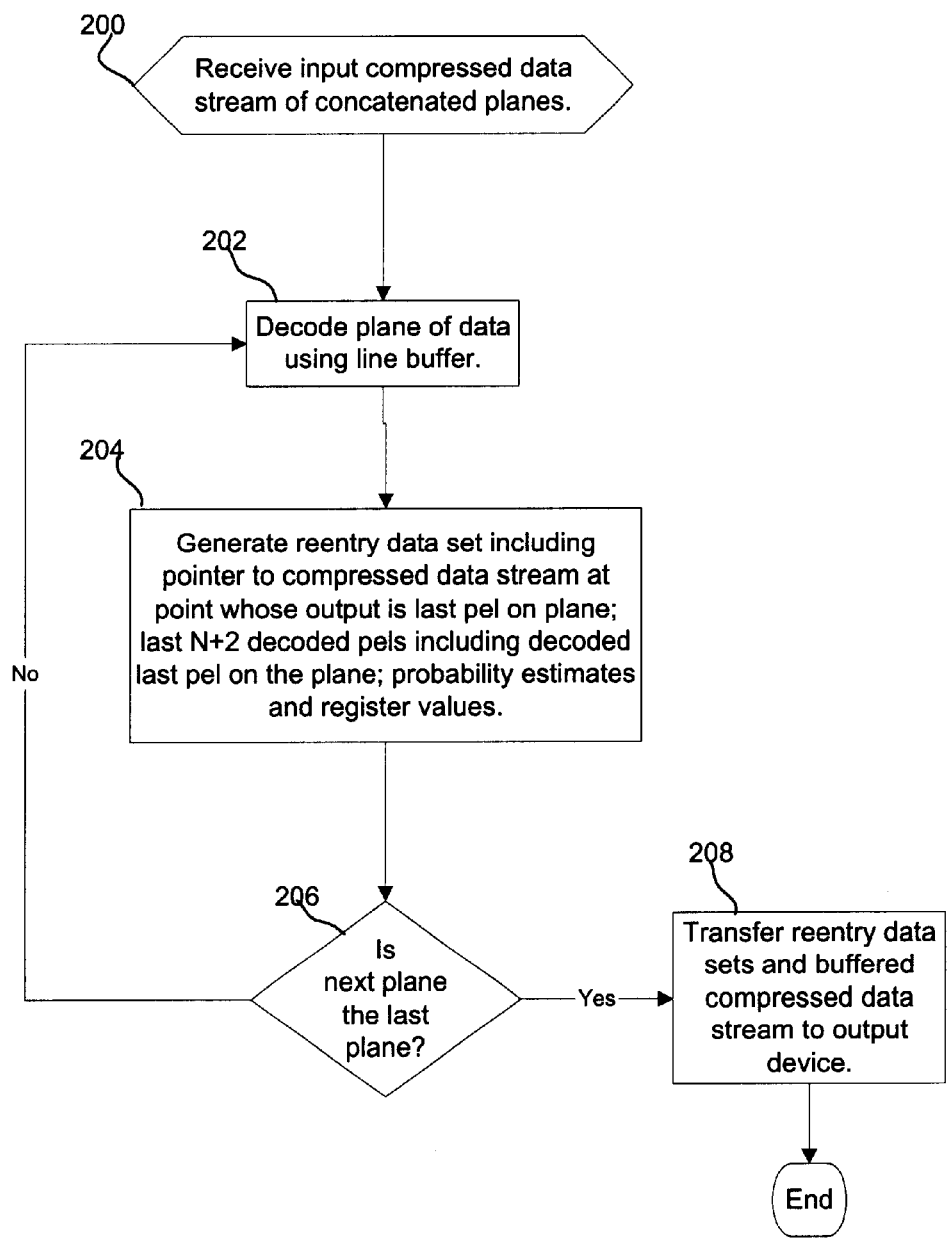
FIG. 5 illustrates logic to generate reentry data sets in accordance with preferred embodiments of the present invention.

FIG. 5. illustrates logic implemented in the reentry decoder 100 to decode the compressed data 102 for the purpose of generating reentry data sets 104 for the decoder 114. Control begins at block 200 with the reentry decoder 100 receiving the compressed data 102. The reentry decoder 100 decodes (at block 202) a plane of bits using a line buffer the compressed data stream 102 in a manner known in the art. The reentry decoder 100 uses a rolling buffer and overwrites previously decoded as each bit is decoded to maintain the last N plus two bits, where N is the number of bits in a line of the planes. To determine when a plane of bits has been decompressed, the reentry decoder 100 would use the known height and width dimensions of the planes in the concatenated compressed data stream 102, and the number of lines in each plane. By keeping track of the cumulative number of decompressed lines, the reentry decoder 100 could determine whether a decompressed line is the last line in a plane. Alternatively, there may be an end of plane marker in the compressed data stream 102, which the reentry decoder 100 would use to determine when the last line of a lane has been decompressed.

After decoding the last bit on the plane and buffering the last N plus two decoded bits including the last decoded bit on the plane, the reentry decoder 100 generates (at block 204) a reentry data set comprising a pointer to a location in the compressed data stream whose decoded output is the first bit in one plane 4, 6, 8 following the first plane 2, the last N +2 decoded bits preceding the first bit in a plane, the 128 probability estimates, and any register values used during decoding. For instance, the Q-coder used in ABIC coding/decoding maintains A and C registers indicating an interval of bits being coded. If (at block 206) the next plane is the last plane to decode, then the reentry decoder 100 transfers (at block 208) the compressed data 102 including any generated reentry data sets 104 to the buffer 112 in the output device 110 and ends. As discussed, the first plane 2 in the compressed data stream 102 is assumed to have initialized values prior to the first bit in the first plane, such that the last N plus two bits in the history line for the first plane 2 all have zero value.

With the logic of FIG. 5, the reentry decoder 100 does not need a large buffer because it only needs to buffer the last N plus two decoded bits at a time for each bit decoded in addition to the statistical data and other information needed to continue decoding, such as probability estimates, register values, etc.

After generating the reentry data sets 104, the reentry decoder 100 transmits the compressed data 102 and reentry data sets 104 to the decoder 114. In preferred embodiments, the reentry decoder 100 transfers the data stream in compressed format regardless of whether the reentry decoder 100 is located internal or external to the output device 110 to minimize the transfer time to the buffer 112 used by the decoder 114.

FIG. 6 illustrates logic implemented in the decoder 114 to decompress the compressed data stream 102 using the generated reentry data sets 104. In FIG. 5, the decoder 114 multiplexes between decoding L lines of bits in each plane, where L comprises one or more lines. Control begins at block 250 with the decoder 114 receiving and buffering in buffer 112 the compressed data stream 102 and reentry data sets 104. The decoder 114 performs a loop at blocks 252 to block 264 to multiplex the decoding of L lines in each of the four planes. If (at block 254) the decoder 114 is starting the decoding process at the first bit in the first plane, then the decoder 114 decodes/decompresses (at block 256) the first L lines of bits in the first plane in a manner known in the art to decompress the initial bits in a compressed data stream. As discussed when decompressing the first line in the data stream 102, the decoder 114 would assume that the previous line included all zero bit values and use initial values for register values and the probability estimate when decoding a first line of an ABIC compressed data stream.

If (at block 254) the decoder 114 is not decoding the first line of the compressed data 102, then the decoder 114 uses (at block 258) the pointer in the reentry data set for plane i to access the compressed data stream 102 at the location addressed by the pointer. The decoder 114 then uses (at block 260) the N plus two history bits, the probability estimates, and the register values saved with the reentry data set for plane i to decode the next L lines of bits in plane i in a manner known in the art. The decoded L lines of bits are stored in their corresponding plane buffer 116a, b, c, or d. After decoding the L lines, the decoder 114 updates (at block 262) the reentry data set for plane i to include decoding information at the state of the last bit decoded in plane i, including a new pointer to a location in the compressed data stream whose output is the bit following the last decoded bit, the previously decoded N +2 bits, the 128 probability estimates, and current register values. In preferred embodiments, a reentry data set for the first plane is first populated with data after the first L lines of bits in the first plane have been decoded using default initialization values. In this way, the decoder 114 can shift to processing bits in the next plane (i +1) and use the updated reentry data set information to later proceed directly to decode the next L lines of bits in plane i after completing the decoding of L lines in the other lanes. At block 264, the decoder 114 proceeds back to block 252 to multiplex hrough the next L lines from the next plane.

After decoding the same L lines from each of the four planes, the decoder 114 reassembles (at block 266) the buffered bits in the four planes so each pixel value has four-bit values, one bit from each plane. The reassembled bits for the pixels in the L lines are then outputted (at block 268), where they may be rendered or further processed, such as screened, halftoned, dithered, etc. If (at block 270) there are further lines of bits in each plane to decompress, then control transfers to block 252 to decode/decompress the next L lines of bits in each plane. In further embodiments, the decoder 114 may begin further decoding operations during the process of reassembling and outputting the buffered bit values.

In the logic of FIG. 6, the decoder 114 multiplexed decoding operations by sequentially decoding L lines from each plane, outputting the decoded data, and then proceeding to decode the next L lines in each plane. In alternative embodiments, the decoder 114 may comprise four separate decoding units to allow for the parallel decoding and buffering of L lines of bits at a time in each plane.

With the logic of FIG. 6, the decoder 114 outputs decompressed data faster than techniques known in the art because the decoder 114 can output L lines of data from each plane before having to complete the decoding of the first three planes. In the prior art, the decoder must buffer the decoded first three planes of data and lines from the fourth plane before data can be outputted. With the preferred embodiments, a smaller buffer size may be used to buffer decoded bits because the decoder 114 only needs to buffer L lines of bits from each plane at a time, not the entire first three planes.

The preferred embodiments utilize the previously generated reentry data sets to allow the decoder to break into different parts of the compressed data stream to decode and output L lines of bits from each plane before proceeding with further lines in the planes. For illustrative purposed a monochrome image with 4-bits per pixel has been used. The preferred embodiments also apply to monochrome pixels with more or less bits per pixel and to the bit planes created from the multiple components of a color image Following are some alternative implementations of the preferred embodiments.

The preferred embodiments may be implemented as a method, apparatus or LC article of manufacture using standard programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present invention.

Preferred embodiments were described with respect to a printer output device. However, the output values may be rendered using output devices other than printers, such as such as display monitors, a storage device for future rendering, etc.

In preferred embodiment, the decoder and reentry decoder are implemented as hardware, e.g., a Field Programmable Gate Array (FPGA), Application Specific Integrated Circuit (ASIC), etc. In alternative embodiments, the decoder and reentry decoder may be implemented as software executed by a processor.

Preferred embodiments were described with respect to a data stream of concatenated planes of bit values compressed using an ABIC algorithm. However, those skilled in the art will recognize that the preferred embodiment technique for generating and using reentry data sets may be used to decode concatenated planes coded using compression algorithms other than ABIC, such as a Huffman coding, G4-MMR algorithm, etc. In alternative algorithms, such as the G4-MMR algorithm, only the last line of history bits are needed, as well as the pointer into the compressed data stream of where to start decoding.

Preferred embodiments were described with respect to using the reentry data sets to decode bit planes. In further embodiments, the data stream being decompressed using the preferred embodiment reentry data sets may not comprise concatenated planes of bit values, but may comprise other types of image streams known in the art, such as non-concatenated data streams.

Preferred embodiments described information used by the decoder in the reentry data sets to decode from the location addressed by the pointer as N plus two previous bits, probability estimates and register values. However, the decoding information included with the reentry data sets may comprise any information the decoder needs in order to begin decoding from the point in the compressed data stream addressed by the pointer.

Figure 1:
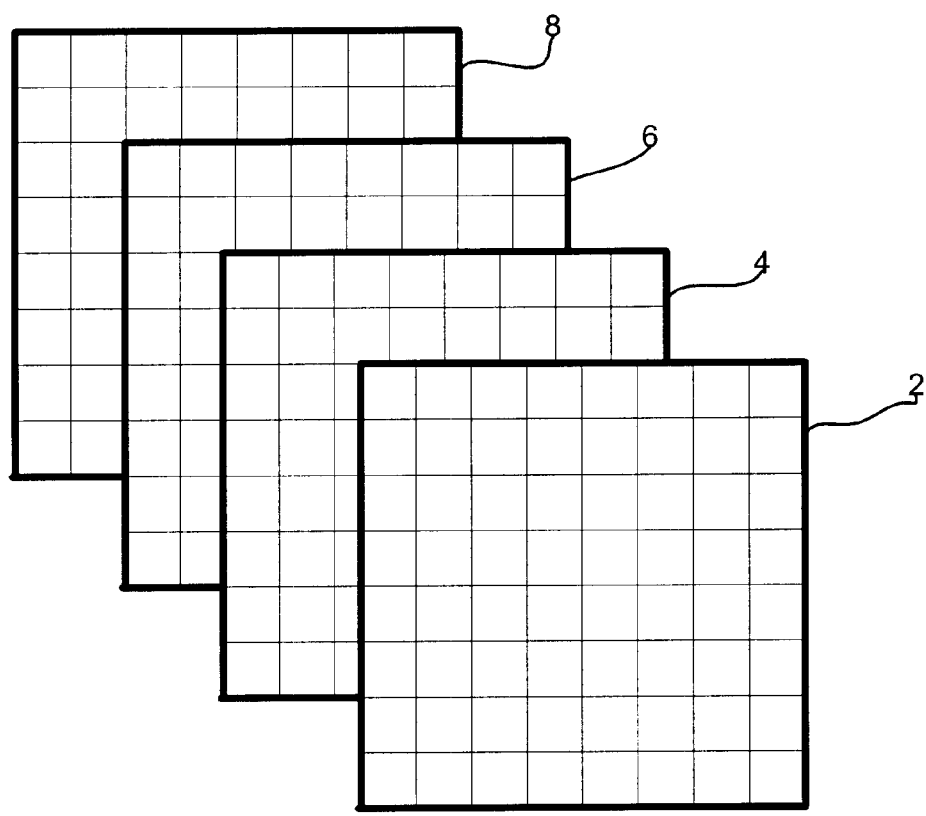
FIGS. 1 and 2 illustrate an arrangement of bit planes in a manner known in the prior art.

In preferred embodiments, the image data was expressed as individual values for each bit in a bit plane, such as described with respect to FIGS. 1 and 2. In alternative embodiments, the bit values in each plane may be expressed as transition points, such that each plane stores the points at which the bit values transition from 0 to 1 or 1 to 0. In such embodiments, the decoder would decode the transition points in a manner known in the art, and then generate lines of bit values for the decompressed transition points.

Preferred embodiments were described with respect to decompressing still mage data comprised of bits. In alternative embodiments, the data stream subject to he decoding/decompression techniques of the preferred embodiments may comprise other types of data than still image data.

In preferred embodiments, the decoder would decode the same L number of lines from each plane before outputting the data. In further embodiments, the decoder may decode a different number of lines of data from each plane and then output reassembled lines of data for all planes for the same lines of bits. Thus, the decoder may not output all the decoded lines for each plane.

In preferred embodiments, the decoder would buffer lines of data from each plane, reassemble the lines from each plane, and then output the reassembled data from each plane. In alternative embodiments, the decoder may output data from less than all the buffers.

In preferred embodiments, the decoder reassembled and outputted the same lines of bit data from each plane. In alternative embodiments, the decoder may output from the plane buffers different lines of data or bits.

In preferred embodiments, the decoder decoded lines of data. In alternative embodiments, the decoder may decode less than all the bits in a line before proceeding to the next plane to decode bits.

Preferred embodiments were described with respect to four planes. However, in alternative embodiments, the concatenated data stream may include more or less than four planes. Still further, the decoding information may provide more or less than N plus two bits of history data. Yet further, the bit stream subject to decompression and reentry does not have to comprise concatenated planes.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for decompressing a compressed data stream, comprising:

receiving at least one reentry data set, wherein each reentry data set includes a pointer to a location in the compressed data stream and decoding information that enables decoding to start from the location addressed by the pointer;

decoding from the beginning of the compressed data stream to a point in the compressed data stream preceding a location addressed by a first reentry data set;

for each generated reentry data set; performing:
 (i) accessing the location in the compressed data stream addressed by the pointer in the reentry data set; and
 (ii) using the decoding information in the reentry data set to decode compressed data from the accessed location to a point in the compressed data stream preceding the location addressed by the pointer in the next reentry data set or to an end of the compressed data stream; and
 (iii) buffering the decoded data; and outputting the buffered decoded data.

2. The method of claim 1, wherein each reentry data set is generated by a reentry decoder that decodes the compressed data stream and passes each reentry data set and the compressed data stream to a decoder to decode the compressed data stream using the reentry data sets.

3. The method of claim 1, wherein each reentry data sets are generated by an encoder when encoding the data stream to generate the compressed data stream.

4. The method of claim 1, wherein the decoding information includes decoded data preceding output produced by decoding the compressed data stream at the location addressed by the pointer and probability estimates used to decode the compressed data at the location addressed by the pointer.

5. The method of claim 4, wherein the data is compressed and decoded using an Adaptive Bi-Level Image Compression (ABIC) algorithm.

6. The method of claim 1, wherein the compressed data comprises concatenated planes of bits from the pixel intensity values, wherein each reentry data set pointer addresses a location in the compressed data stream that when decoded produces a first bit value in one plane following the first plane.

7. The method of claim 6, wherein each reentry data set is generated by first decoding the compressed data stream to generate each reentry data set, further comprising:

buffering decoded bits preceding a current decoded bit and probability estimates;

if the current decoded bit is a first bit on a next plane, then saving as a new reentry data set decoded bits preceding the current decoded bit and the probability estimates.

8. The method of claim 6, wherein a set of data is decoded in each of the planes and buffered before decoding a next set of data from each plane.

9. The method of claim 8, wherein outputting the buffered data comprises outputting the sets of buffered data from each of the planes, wherein the next decoded sets of data from each plane overwrite the previous buffered sets of data from each plane.

10. The method of claim 8, wherein the set of data comprises a plurality of lines of data.

11. The method of claim 8, wherein the size of the data set decoded in each plane is the same.

12. The method of claim 1, wherein there are multiple reentry data sets, further performing multiple iterations of the following operations until the entire data stream has been decoded:

decoding further data prior to each reentry data set; and decoding further data following the last reentry data set.

13. The method of claim 12, further performing during each iteration of decoding:

after decoding data prior to the first reentry data set, saving a pointer indicating a location in the compressed data stream having decoded output following the data just decoded and decoding information to allow decoding of the compressed data addressed by the pointer in a subsequent iteration of decoding the data; and after decoding data using the decoding information in the reentry data set, updating the pointer to indicate a location in the compressed data stream having decoded output following the data just decoded and updating the decoding information to allow decoding of the compressed data addressed by the updated pointer in the subsequent iteration of decoding the data.

14. The method of claim 13, wherein there are a plurality of reentry data sets, wherein the compressed data stream comprises concatenated planes of intensity values for pixels, wherein prior to the first iteration of decoding the compressed data stream, each reentry data set pointer addresses a first bit value in one plane following. the first plane, and wherein during each iteration of decoding, lines of bits are decoded from each plane.

15. The method of claim 14, further performing during each iteration of decoding:

reassembling buffered bit data from each of the planes to provide values for each pixel, wherein the reassembled bit data is outputted.

16. The method of claim 1, wherein each reentry data set is generated by a first decoder and wherein a second decoder uses the reentry data sets to decode and buffer the compressed data stream.

17. A system for decompressing a compressed data stream, comprising:

means for receiving at least one reentry data set, wherein each reentry data set includes a pointer to a location in the compressed data stream and decoding information that enables decoding to start from the location addressed by the pointer;

means for decoding from the beginning of the compressed data stream to a point in the compressed data stream preceding a location addressed by a first reentry data set;

means for accessing the location in the compressed data stream addressed by the pointer in the reentry data set;

means for using the decoding information in the reentry data set to decode compressed data from the accessed location to a point in the compressed data stream preceding the location addressed by the pointer in the next reentry data set or to an end of the compressed data stream; and means for buffering the decoded data; and means for outputting the buffered decoded data.

18. The system of claim 17, wherein the means for generating each reentry data set comprises a reentry decoder that decodes the compressed data stream and passes each reentry data set and the compressed data stream to a decoder to decode the compressed data stream using the reentry data sets.

19. The system of claim 17, wherein each reentry data set is generated by an encoder when encoding the data stream to generate the compressed data stream.

20. The system of claim 17, wherein the decoding information includes decoded data preceding output produced by decoding the compressed data stream at the location addressed by the pointer and probability estimates used to decode the compressed data at the location addressed by the pointer.

21. The system of claim 20, wherein the means for compressing and decoding the data comprises an Adaptive Bi-Level Image Compression (ABIC) algorithm.

22. The system of claim 17, wherein the compressed data comprises concatenated planes of bits from the pixel intensity values, wherein each reentry data set pointer addresses a location in the compressed data stream that when decoded produces a first bit value in one plane following the first plane.

23. The system of claim 22, wherein each reentry data set is generated by first decoding the compressed data stream to generate multiple reentry data sets, further comprising:

means for buffering decoded bits preceding a current decoded bit and probability estimates; and means for saving as a new reentry data set decoded bits preceding the current decoded bit and the probability estimates if the current decoded bit is a first bit on a next plane.

24. The system of claim 22, wherein a set of data is decoded in each of the planes and buffered before decoding a next set of data from each plane.

25. The system of claim 24, wherein the means for outputting the buffered data performs outputting the sets of buffered data from each of the planes, wherein the next decoded sets of data from each plane overwrite the previous buffered sets of data from each plane.

26. The system of claim 24, wherein the set of data comprises a plurality of lines of data.

27. The system of claim 24, wherein the size of the data set decoded in each plane is the same.

28. The system of claim 17, wherein there are multiple reentry data sets, wherein the means performs multiple iterations of the following operations until the entire data stream has been decoded:

decoding further data prior to each reentry data set; and decoding further data following the last reentry data set.

29. The system of claim 28, wherein the means performs during each iteration of decoding:

after decoding data prior to the first reentry data set, saving a pointer indicating a location in the compressed data stream having decoded output following the data just decoded and decoding information to allow decoding of the compressed data addressed by the pointer in a subsequent iteration of decoding the data; and after decoding data using the decoding information in the reentry data set, updating the pointer to indicate a location in the compressed data stream having decoded output following the data just decoded and updating the decoding information to allow decoding of the compressed data addressed by the updated pointer in the subsequent iteration of decoding the data.

30. The system of claim 29, wherein the compressed data stream comprises concatenated planes of intensity values for pixels, wherein prior to the first iteration of decoding the compressed data stream, each reentry data set pointer addresses a first bit value in one plane following the first plane, and wherein during each iteration of decoding, lines of bits are decoded from each plane.

31. The system of claim 30, wherein the means further performs during each iteration of decoding:

reassembling buffered bit data from each of the planes to provide values for each pixel, wherein the reassembled bit data is outputted.

32. The system of claim 17, wherein the means for generating each reentry data set comprises a first decoder and wherein the means for decoding and buffering the compressed data stream that uses each reentry data set comprises a second decoder.

33. An article of manufacture including logic for decompressing a compressed data stream by:

receiving at least one reentry data set, wherein each reentry data set includes a pointer to a location in the compressed data stream and decoding information that enables decoding to start from the location addressed by the pointer;

decoding from the beginning of the compressed data stream to a point in the compressed data stream preceding a location addressed by a first reentry data set;

for each generated reentry data set, performing:
(i) accessing the location in the compressed data stream addressed by the pointer in the reentry data set; and
(ii) using the decoding information in the reentry data set to decode compressed data from the accessed location to a point in the compressed data stream preceding the location addressed by the pointer in the next reentry data set or to an end of the compressed data stream; and
(iii) buffering the decoded data; and outputting the buffered decoded data.

34. The article of manufacture of claim 33, wherein each reentry data set is generated by a reentry decoder that decodes the compressed data stream and passes each reentry data set and the compressed data stream to a decoder to decode the compressed data stream using each reentry data set.

35. The article of manufacture of claim 33, wherein the each reentry data set is generated by an encoder when encoding the data stream to generate the compressed data stream.

36. The article of manufacture of claim 33, wherein the decoding information includes decoded data preceding output produced by decoding the compressed data stream at the location addressed by the pointer and probability estimates used to decode the compressed data at the location addressed by the pointer.

37. The article of manufacture of claim 36, wherein the data is compressed and decoded using an Adaptive Bi-Level Image Compression (ABIC) algorithm.

38. The article of manufacture of claim 33, wherein the compressed data comprises concatenated planes of bits from the pixel intensity values, wherein each reentry data set pointer addresses a location in the compressed data stream that when decoded produces a first bit value in one plane following the first plane.

39. The article of manufacture of claim 38, wherein each reentry data set is generated by first decoding the compressed data stream to generate multiple reentry data sets, wherein the logic further performs:

buffering decoded bits preceding a current decoded bit and probability estimates;

if the current decoded bit is a first bit on a next plane, then saving as a new reentry data set decoded bits preceding the current decoded bit and the probability estimates.

40. The article of manufacture of claim 38, wherein a set of data is decoded in each of the planes and buffered before decoding a next set of data from each plane.

41. The article of manufacture of claim 40, wherein outputting the buffered data comprises outputting the sets of buffered data from each of the planes, wherein the next decoded sets of data from each plane overwrite the previous buffered sets of data from each plane.

42. The article of manufacture of claim 40, wherein the set of data comprises a plurality of lines of data.

43. The article of manufacture of claim 40, wherein the size of the data set decoded in each plane is the same.

44. The article of manufacture of claim 33, wherein there are multiple reentry data sets, wherein the logic further performs multiple iterations of the following operations until the entire data stream has been decoded:

decoding further data prior to each reentry data set; and decoding further data following the last reentry data set.

45. The article of manufacture of claim 44, wherein there are multiple reentry data sets, wherein the logic further perform during each iteration of decoding:

after decoding data prior to the first reentry data set, saving a pointer indicating a location in the compressed data stream having decoded output following the data just decoded and decoding information to allow decoding of the compressed data addressed by the pointer in a subsequent iteration of decoding the data; and after decoding data using the decoding information in the reentry data set, updating the pointer to indicate a location in the compressed data stream having decoded output following the data just decoded and updating the decoding information to allow decoding of the compressed data addressed by the updated pointer in the subsequent iteration of decoding the data.

46. The article of manufacture of claim 45, wherein the compressed data stream comprises concatenated planes of intensity values for pixels, wherein prior to the first iteration of decoding the compressed data stream, each reentry data set pointer addresses a first bit value in one plane following the first plane, and wherein during each iteration of decoding, lines of bits are decoded from each plane.

47. The article of manufacture of claim 46, wherein the logic further performs during each iteration of decoding:

reassembling buffered bit data from each of the planes to provide values for each pixel, wherein the reassembled bit data is outputted.

48. The article of manufacture of claim 33, wherein the logic generating each reentry data set is implemented in a first decoder and wherein the logic using the reentry data sets to decode and buffer the compressed data stream is implemented in a second decoder.

49. The article of manufacture of claim 33, wherein the logic is implemented as code in a computer readable medium accessible to a processor that executes the code.

50. The article of manufacture of claim 33, wherein the logic is implemented as circuitry within an integrated circuit chip.

51. A computer readable medium including data structures used for decompressing a compressed data stream, comprising:

at least one reentry data sets, wherein each reentry data set includes a pointer to a location in the compressed data stream and decoding information that enables decoding to start from the location addressed by the pointer, wherein the data stream is decoded using the reentry data sets by decoding from the beginning of the compressed data stream to a point in the compressed data stream preceding a location addressed by a first reentry data set and for each generated reentry data set, performing: (i) accessing the location in the compressed data stream addressed by the pointer in the reentry data set; and (ii) using the decoding information in the reentry data set to decode compressed data from the accessed location to a point in the compressed data stream preceding the location addressed by the pointer in the next reentry data set.

52. The computer readable medium of claim 51, wherein the decoding information includes decoded data preceding output produced by decoding the compressed data stream at the location addressed by the pointer and probability estimates used to decode the compressed data at the location addressed by the pointer.

53. The computer readable medium of claim 51, wherein the compressed data comprises concatenated planes of bits from the pixel intensity values, wherein each reentry data set pointer addresses a location in the compressed data stream that when decoded produces a first bit value in one plane following the first plane.

* * * * *